United States Patent
Burgess (10) Patent No.: US 7,768,976 B2
(45) Date of Patent: Aug. 3, 2010

(54) METHOD FOR SELECTING AN INTER-SUBNET IDLE HAND-OFF TECHNIQUE

(75) Inventor: John K. Burgess, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1052 days.

(21) Appl. No.: 11/328,648

(22) Filed: Jan. 10, 2006

(65) Prior Publication Data

US 2007/0160008 A1    Jul. 12, 2007

(51) Int. Cl.
*H04W 4/00* (2009.01)
*H04W 36/00* (2009.01)
(52) U.S. Cl. ............ 370/331; 455/436; 455/437; 455/439
(58) Field of Classification Search ......... 455/436–439; 370/331
See application file for complete search history.

(56) References Cited

U.S. PATENT DOCUMENTS

| | | | |
|---|---|---|---|
| 6,539,227 B1* | 3/2003 | Jetzek et al. | 455/442 |
| 2002/0196749 A1* | 12/2002 | Eyuboglu et al. | 370/328 |
| 2003/0135626 A1* | 7/2003 | Ray et al. | 709/228 |
| 2006/0274692 A1* | 12/2006 | Ryu | 370/331 |

* cited by examiner

*Primary Examiner*—Vincent P Harper
*Assistant Examiner*—Marisol Figueroa
(74) *Attorney, Agent, or Firm*—Williams, Morgan & Amerson, PC (57) ABSTRACT

The present invention provides a method that includes accessing a first identifier associated with an idle mobile unit having a first session with a first subnet and a second identifier associated with a second subnet and determining whether the idle mobile unit has moved from the first subnet to the second subnet based on first portions of the first and second identifiers. The method also includes determining whether the first and second subnets are included in a first plurality of subnets based on second portions of the first and second identifiers and selecting one of a plurality of call session transfer techniques for transferring the first session from the first subnet to the second subnet based on whether the first and second subnets are included in the first plurality of subnets.

18 Claims, 4 Drawing Sheets

METHOD FOR SELECTING AN INTER-SUBNET IDLE HAND-OFF TECHNIQUE

BACKGROUND OF THE INVENTION

1. Field of the Invention

This invention relates generally to communication systems, and, more particularly, to wireless communication systems.

2. Description of the Related Art

In conventional wireless telecommunications, one or more mobile units (or access terminals) may establish a wireless link to a Radio Access Network (RAN). The RAN architecture is typically hierarchical and call state information associated with each mobile unit call session is stored in a central repository, such as a Radio Network Controller (RNC), a Packet Data Serving Node (PDSN), and the like. One alternative to the conventional hierarchical network architecture is a distributed architecture including a network of base station routers. For example, each base station router may combine RNC and/or PDSN functions in a single entity that manages radio links between one or more mobile units and an outside network, such as the Internet. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the RNC and PDSN of hierarchical networks may be reduced or removed.

In a distributed architecture, one or more mobile units may establish a call session with any one of the plurality of base station routers. Accordingly, each base station router should be capable of assigning an identifier, such as a Unicast Access Terminal Identifier (UATI), to the mobile unit. For example, a proposed Code Division Multiple Access (CDMA) protocol standard, sometimes referred to as the EVolution-Data Only (EVDO) standard, specifies a unique 128-bit UATI that is assigned to a mobile unit when a call session is initiated by the mobile unit. The mobile unit maintains the UATI for the duration of the call session. In the current implementation, the EVDO call session UATI is divided into two parts: a 104-bit UATI104 and a 24-bit UATI024. The UATI024 portion is unique to the mobile unit for the duration of the call session and the UATI104 is common to all mobile units within a predetermined subnet of base station routers in the distributed network.

In operation, base station routers in a conventional distributed network may broadcast, or advertise, their subnet address, e.g. the address indicated by the UATI104 portion of the UATI. However, the address is generally too long for mobile units to insert in the user identification portion of each message sent to the base station routers, so the base station routers also typically advertise a color code for use by the mobile station, which is typically an 8-bit representation of (or alias to) the 104-bit UATI104 subnet address. The base station router providing service to the mobile unit may change, e.g., due to fluctuating channel conditions and/or when the mobile unit roams between different subnets in the distributed network. Accordingly, mobile units may determine whether or not the subnet including the base station router providing service to the mobile unit has changed by monitoring the advertised subnet address on the control channel.

Mobile units typically request a call session transfer from the old subnet to the new subnet when the mobile unit detects a change in the subnet address. For example, a mobile unit may initiate a call session with a first base station router belonging to a first subnet having a first subnet address. The first base station router assigns a UATI to the mobile unit. When the mobile unit becomes associated with a second base station router belonging to a second subnet having a second subnet address, the mobile unit may request, using the associated color code, that its previous call session information be transferred from the first base station router to the second base station router. The color code may be used by the base station router to locate the first subnet when the mobile unit is able to determine how it made the transition from the first subnet to the second subnet. For example, when an idle mobile unit roams from the first subnet to the second subnet, which neighbors the first subnet, the color codes uniquely identify the first and second subnets and so they may be used to locate the first subnet.

However, mobile units are not always able to determine how they made a transition from one subnet to another. For example, coverage holes, temporary loss of the radiofrequency carrier, powering down the mobile unit during travel, and other conditions may prevent the mobile unit from determining how a transition was made between subnets. When the mobile unit is not able to determine how a transition was made between subnets, the mobile unit cannot ensure that the color codes uniquely identify the old and/or new subnets. For example, if a user powers down a mobile unit before traveling from New York to Los Angeles, the mobile unit cannot guarantee that the color code associated with the old subnet in New York will uniquely identify the old subnet to a base station router in Los Angeles. To the contrary, it is very likely that the base station router in Los Angeles would interpret the color code associated with the old subnet as indicating a different subnet in the Los Angeles area.

Idle mobile units are not typically able to request a call session transfer using only the color code when the mobile unit cannot determine how it transitioned from one subnet to another. Instead, the mobile unit initiates a new call session with the new base station router in the new subnet and then attempts to locate the previous call session using the complete subnet identifier, e.g. the UATI assigned by the originating base station router. For example, in 1xEVDO wireless systems, idle mobile units that cannot determine how a subnet transition was made typically create a new session with the base station router in the new subnet. A connection between the mobile unit and the base station router is then formed and then the mobile unit may negotiate transition of the call session associated with the originating base station router to the base station router in the new subnet using the full 128-bit UATI. This technique is conventionally referred to as the Prior Session method of inter-subnet idle hand-off.

Idle mode hand-off techniques such as the Prior Session method have a number of disadvantages. For example, idle mode hand-offs typically occur in border regions near the edges of coverage areas associated with base station routers and/or subnets. The border regions are frequently areas of poor and/or fluctuating radio frequency coverage, at least in part because they may be relatively distant and/or obscured from the base station router. Consequently, mobile units in the border regions may be frequently and/or rapidly handed off between different base station routers. In some cases, the handoff frequency may be so rapid that the mobile unit may initiate a call session transfer using the Prior Session method after being handed off from a first base station router to a second base station router, only to be transferred back to the first base station router before the call session transfer is complete. However, the mobile unit cannot resume its previous call session with the first base station because the mobile unit has already initiated the Prior Session method. Instead, the mobile unit must request a prior session from the second base station router, resulting in session churn. In some cases, the older session associated with the first base station router is not immediately removed and may persist for a time period specified by the system operator, which may be as long as several hours, or the standards default duration of 54 hours. An accumulation of these older sessions may reduce the number of available call sessions and artificially inflate session usage. When the system is heavily loaded, the accumulated older stranded sessions may block the creation of new sessions.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided that may include accessing a first identifier associated with an idle mobile unit having a first session with a first subnet and a second identifier associated with a second subnet and determining whether the idle mobile unit has moved from the first subnet to the second subnet based on first portions of the first and second identifiers. The method also includes determining whether the first and second subnets are included in a first plurality of subnets based on second portions of the first and second identifiers and selecting one of a plurality of call session transfer techniques for transferring the first session from the first subnet to the second subnet based on whether the first and second subnets are included in the first plurality of subnets.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
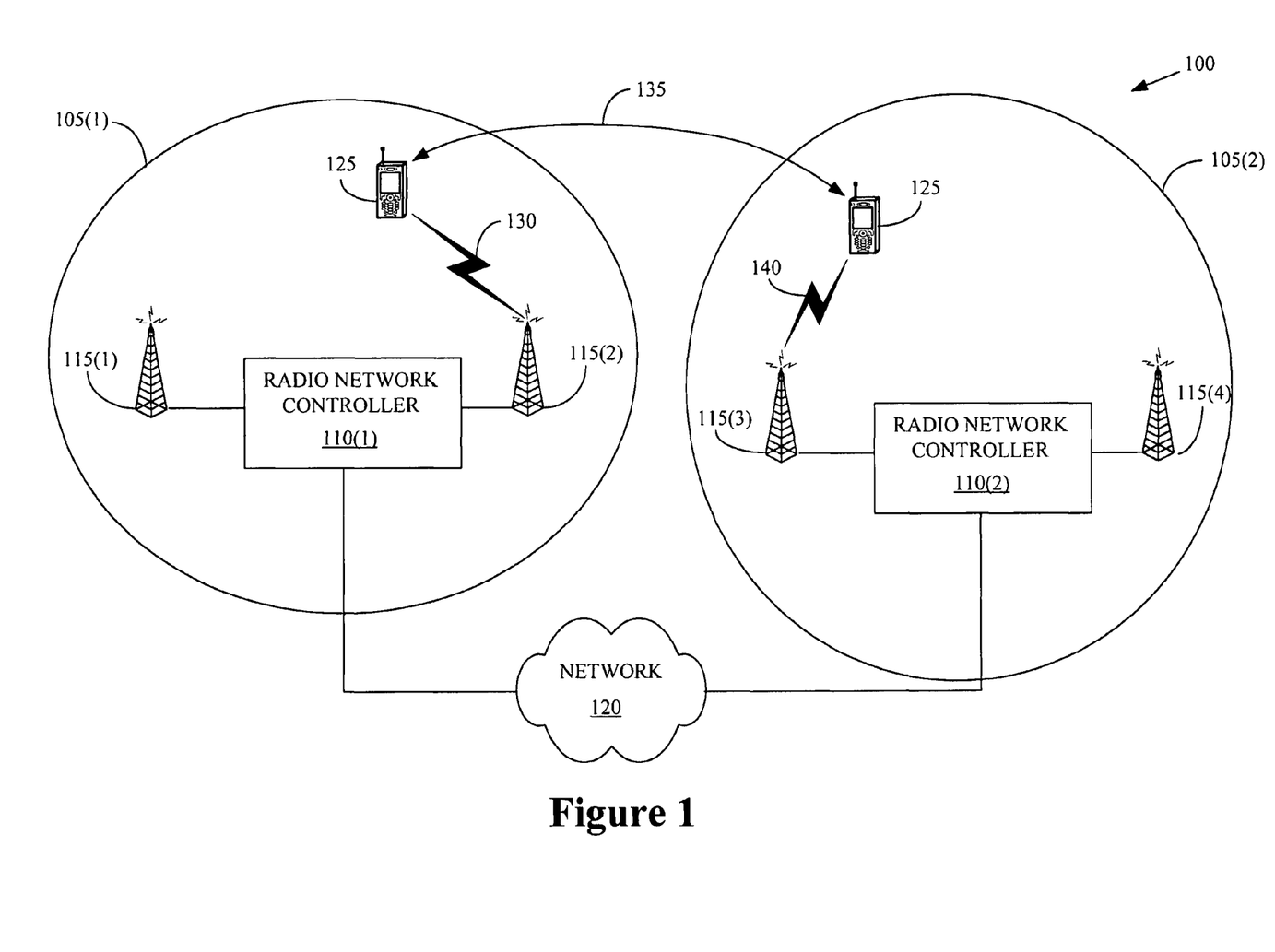
FIG. 1 conceptually illustrates one exemplary embodiment of a communication system, in accordance with the present invention.

FIG. 1 conceptually illustrates one exemplary embodiment of a communication system 100. In the illustrated embodiment, the communication system 100 is a wireless communication system 100 that operates according to a Code Division Multiple Access (CDMA) protocol. For example, the communication system 100 may operate according to a proposed CDMA protocol standard, sometimes referred to as the EVolution-Data Only (EVDO) standard. However, persons of ordinary skill in the art having benefit of the present disclosure should appreciate that the present invention is not limited to communication systems 100 that operate according to the EVDO standard. In alternative embodiments, the communication system 100 may operate according to other protocols and/or standards, such as Universal Mobile Telecommunication System (UMTS) protocols, Global System for Mobile communications (GSM) protocols, and the like.

The communication system 100 includes one or more subnets 105(1-2). In the following description, the indices (1-2) may be used to refer to individual subnets 105(1), 105(2) or subsets of the subnets 105(1-2). However, the indices (1-2) may be dropped when the subnets 105 are referred to collectively. This numbering convention may also be applied to other elements that are referred to herein using a reference number and one or more indices. In the illustrated embodiment, each of the subnets 105 includes a radio network controller 110 that is communicatively coupled to one or more base station routers 115. Although FIG. 1 depicts two base station routers 115(1-2), 115(3-4) communicatively coupled to the radio network controllers 110(1), 110(2), respectively, persons of ordinary skill in the art having benefit of the present disclosure should appreciate that the present invention is not so limited. In alternative embodiments, any number of base station routers 115 may be communicatively coupled to the radio network controllers 110. Furthermore, persons of ordinary skill in the art having benefit of the present disclosure should appreciate that the present invention is not limited to embodiments in which the same number of base station routers 115 are communicatively coupled to each of the radio network controllers 110.

The radio network controllers 110 are also communicatively coupled to a network 120. In the illustrated embodiment, the network 120 includes a wireless communication network 120 that operates according to the EVDO protocols. However, persons of ordinary skill in the art having benefit of the present disclosure should appreciate that the network 120 is not limited to operating according to the EVDO protocols. In alternative embodiments, the network 120 may include wireless and/or wired portions that operate according to protocols such as UMTS, CDMA or CDMA 2000 protocols, GSM protocols, Public Switched Telephone Network (PSTN) protocols, Plain Old Telephone System (POTS) protocols, Bluetooth protocols, IEEE 802 protocols, and the like. In the illustrated embodiment, the network 120 may provide for communications between the radio network controller 110(1) and the radio network controller 110(2).

The base station routers 115 may provide wireless connectivity to one or more mobile units 125 within geographic areas, or cells, associated with the subnets 105. Persons of ordinary skill in the art should appreciate that the mobile unit 125 may also be referred to using terms such as "access terminal," "mobile terminal," and the like. Exemplary mobile units 125 may include cellular telephones, personal data assistants, smart phones, text messaging devices, wireless interface cards, laptop computers, desktop computers, and the like. In the illustrated embodiment, the base station router 115(2) provides wireless connectivity to the mobile unit 125 over the air interface 130. The air interface 130 may include various channels including traffic channels, paging channels, signaling channels, and the like. Techniques for establishing, maintaining, and transferring signals and/or data using channels of the air interface 130 are known to persons of ordinary skill in the art and, in the interest of clarity, only those aspects of operation of the air interface 130 that are relevant to the present invention will be discussed further herein.

The mobile unit 125 may be assigned an identifier. In one embodiment, the identifier may be a Unicast Access Terminal Identifier (UATI), which may be assigned by the base station router 115(2). For example, if the base station router 115(2) operates according to the EVolution-Data Only (EVDO) standard, the base station router 115(2) may assign a 128-bit UATI to the mobile unit 125, which may maintain the UATI for the duration of the call session. A portion of the identifier assigned to the mobile unit 125 may be used to identify the subnet 105(1). In one embodiment, a portion of the identifier may be associated with a color code, which is typically an 8-bit representation of (or alias to) a 104-bit subset of the UATI subnet address. The color code may be used to identify the subnets 105 within certain limits, as will be discussed in detail below, but the color code does not typically uniquely identify the subnets 105. For example, subnets that are separated by large distances and/or are operated by different service providers may share the same color code in some instances.

In the illustrated embodiment, the mobile unit 125 is in idle mode. As used herein, the term "idle" will be used to refer to mobile units 125 that have acquired the network 120 and have a call session, e.g., with the base station router 115(2) over the air interface 130. However, idle mobile units 125 may not have an open connection with the network 120. Instead, idle mobile units 125 may monitor one or more paging channels of the air interface 130. For example, if the base station routers 115 operate according to 1xEVDO, the mobile unit 125 monitors a 1xEVDO Paging Channel in slots assigned to (and/or negotiated for) the mobile unit 125. The idle mobile unit 125 may enter the active mode in response to signaling received from the base station routers 115, e.g., a message indicating that information destined for the idle mobile unit 125 has arrived. Alternatively, the idle mobile unit 125 may initiate the active mode, e.g., when a user of the idle mobile unit 125 wants to place a call to another mobile unit (not shown).

The idle mobile unit 125 may roam from the subnet 105(1) to the subnet 105(2), as indicated by the arrow 135. Depending on the circumstances, the idle mobile unit 125 may or may not know the transition path that led from the subnet 105(1) to the subnet 105(2). For example, the subnets 105(1-2) may be neighbors and so the idle mobile unit 125 may be able to determine that the transition path led directly from the subnet 105(1) to the neighboring subnet 105(2). However, coverage holes, temporary loss of the radiofrequency carrier, powering down the idle mobile unit 125 during travel, and other conditions may prevent the idle mobile unit 125 from determining the transition path from the subnet 105(1) to the subnet 105(2). For example, the idle mobile unit 125 may not be able to determine whether it has passed between neighboring subnets 105(1-2) or between subnets 105(1-2) separated by many thousands of miles.

The idle mobile unit 125 may determine that it has roamed between subnets 105 by comparing portions of the mobile unit identifier with an identifier associated with the new subnet 105. For example, the idle mobile unit 125 may periodically compare masked portions of the mobile unit identifier with a masked portion of a current subnet identifier, as will be discussed in detail below. If the masked portions of the two identifiers are the same, the idle mobile unit 125 may conclude that it has not roamed between subnets 105. However if the masked portions of the two identifiers are different, the idle mobile unit 125 may conclude that it has roamed between subnets 105. The idle mobile unit 125 may then compare another masked portion of the mobile unit identifier to another corresponding masked portion of the subnet identifier to determine whether or not the mobile unit 125 has roamed between predetermined groups of subnets 105 or within one of the predetermined groups of subnets 105, as will be discussed in detail below.

In various embodiments, the mobile unit 125 may select a call session transfer technique based on the comparisons of the two masked portions of the mobile unit identifier and the subnet identifier. For example, if the second comparison of the second masked portions of the subnet and mobile unit identifiers indicate that the mobile unit 125 has roamed within a predetermined group of subnets 105, the mobile unit 125 may select a normal idle mode call session transfer technique to transfer the previous call session from the subnet 105(1) to the subnet 105(2). The transferred call session may then be associated with an air interface 140 between the base station 115(3) and the mobile unit 125. Alternatively, if the second comparison of the second masked portions of the subnet and mobile unit identifiers indicate that the mobile unit 125 has roamed between predetermined groups of subnets 105, but the mobile unit 125 cannot determine the transition path between the subnets 105, the mobile unit 125 may select a different call session transfer technique, such as a Prior Session call session transfer. In the Prior Session technique, the mobile unit 125 may request that a new call session be initiated between the base station 115(3) and the mobile unit 125. A connection associated with the new call session may be formed over the air interface 140 and then the call session information associated with the prior session may be transferred to the base station router 115(3).

Figure 2:
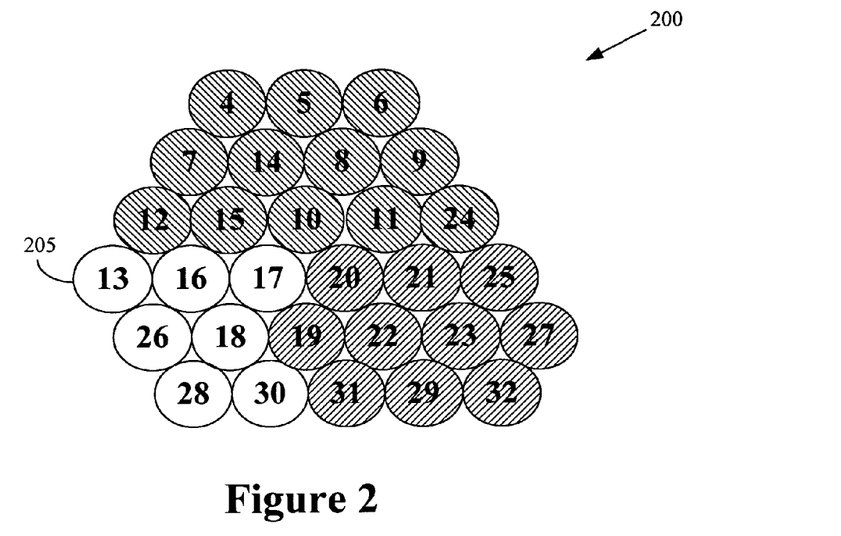
FIG. 2 conceptually illustrates one exemplary embodiment of a geographic area including a plurality of subnets served by one or more base station routers, in accordance with the present invention.

FIG. 2 conceptually illustrates one exemplary embodiment of a geographic area 200 including a plurality of subnets 205 served by one or more base station routers (only one subnet is indicated in FIG. 2). In the illustrated embodiment, the subnets 205 are associated with a color code, as indicated by the number within each of the subnets 205. In the interest of clarity, the color codes in the subnets 205 are indicated by base-10 numerals, e.g., the numerals 4, 5, 6, . . . , 30, 31. However, the present invention is not limited to color codes that are represented by base-10 numerals. Persons of ordinary skill in the art having benefit of the present disclosure should appreciate that the color codes may be represented in any manner. For example, the color codes may be represented using 8 bits, i.e., using a base-2 system. Persons of ordinary skill in the art should also appreciate that the areas served by each of the subnets 205 in the illustrated embodiment are represented by circles, but that in practice the areas associated with the subnets 205 may have irregular shapes, which may differ from each other and may change over time.

The color codes associated with the subnets 205 may uniquely identify the subnets 205 to mobile units moving between the subnets 205 as long as the mobile unit remains within the area 200. For example, a mobile unit (not shown) that moves from the subnet 205 indicated by the color code 4 to the subnet 205 indicated by the color code 14 and on the to subnet 205 indicated by the color code 29 may determine which subnet 205 is currently providing wireless connectivity by referring to the color code broadcast by base stations (not shown) associated with the appropriate subnet 205. In one embodiment, the subnets 205 may also be combined into groups, as indicated by the hatching. For example, the subnets 205 indicated by the color codes 4, 5, 6, . . . may be in a first group and the subnets 205 indicated by the color codes 13, 16, 17, . . . may be in a second group. Thus, the mobile units may also be able to determine whether or not they are within one of the groups by referring to the color code broadcast by base stations associated with the subnets 205 in the groups.

Figure 3:
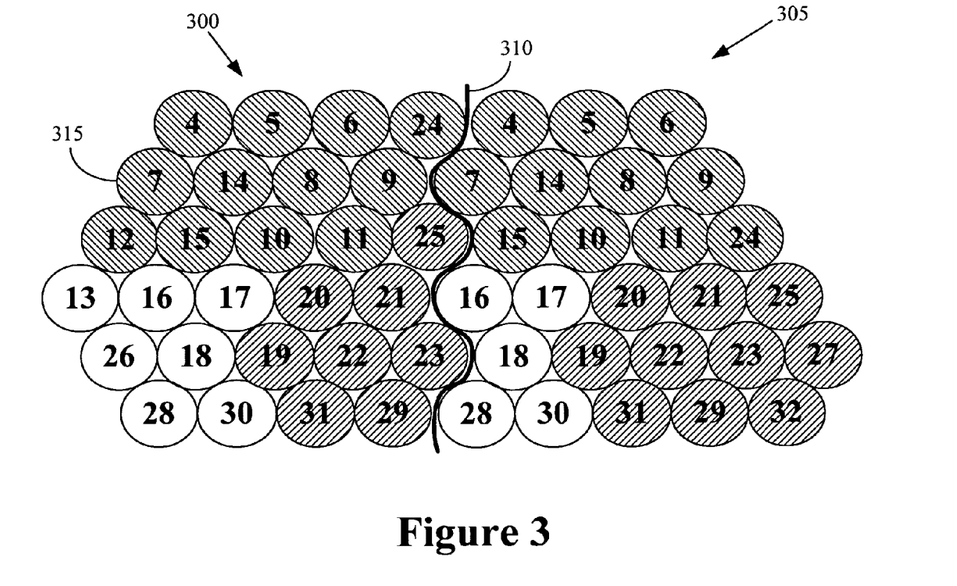
FIG. 3 conceptually illustrates one exemplary embodiment of adjacent geographic areas separated by a boundary line, in accordance with the present invention.

FIG. 3 conceptually illustrates one exemplary embodiment of adjacent geographic areas 300, 305 separated by a boundary line 310. In the illustrated embodiment, the geographic areas 300, 305 each include a plurality of subnets 315 (only one indicated in FIG. 3) served by one or more base station routers. Each of the subnets 315 is associated with a color code, as indicated by the number within each of the subnets 315. As discussed above, the color codes in the subnets 315 are indicated by base-10 numerals, e.g., the numerals 4, 5, 6, . . . , 30, 31, but the present invention is not so limited. In one embodiment, the subnets 315 may be combined into groups, as indicated by the hatching. Persons of ordinary skill in the art should also appreciate that the subnets 315 in the illustrated embodiment are represented by circles, but that in practice the subnets 315 may have irregular shapes, which may differ from each other and may change over time. Furthermore, the geographic areas 300, 305 may not be necessarily adjacent to each other, although in the interest of clarity they are depicted as being adjacent in FIG. 3.

The color codes associated with the subnets 315 may not be able to uniquely identify the subnets 315 to mobile units moving between the subnets 315. For example, if a mobile unit (not shown) moves from one subnet 315 anywhere in 300 or 305 to another subnet 315 anywhere in 300 or 305, but the mobile unit is not able to determine the transition path that it took to get to its current subnet 315, then the base station router may not be able to determine whether the color code corresponds to the subnet 315 in the area 300 or the subnet 315 in the area 305 that is currently providing wireless connectivity by referring to the color code normally sent by mobile stations (not shown) when requesting a subnet transfer. Consequently, the base station router may not be able to locate the previous serving subnet 315 using the previous value of the color code. The mobile unit may then request that a new call session be initiated and a connection associated with the new call session may be formed over an air interface. The call session information associated with the prior session, including the full 128-bit UATI, may then be transferred to a base station router in the current subnet 315.

However, if mobile unit is able to determine the transition path that it took to get to its current subnet 315, then the mobile unit may be able to determine whether it is the subnet 315 in the area 300 or the subnet 315 in the area 305 that is currently providing wireless connectivity by referring to the color code broadcast by base stations (not shown) associated with the appropriate subnet 315. Accordingly, the mobile unit may be able to locate the previous serving (or originating) subnet 315 using the previous value of the color code. The mobile unit may therefore be able to request that the previous call session associated with the originating subnet 315 be transferred to the current serving subnet 315, as discussed above.

Figure 4:
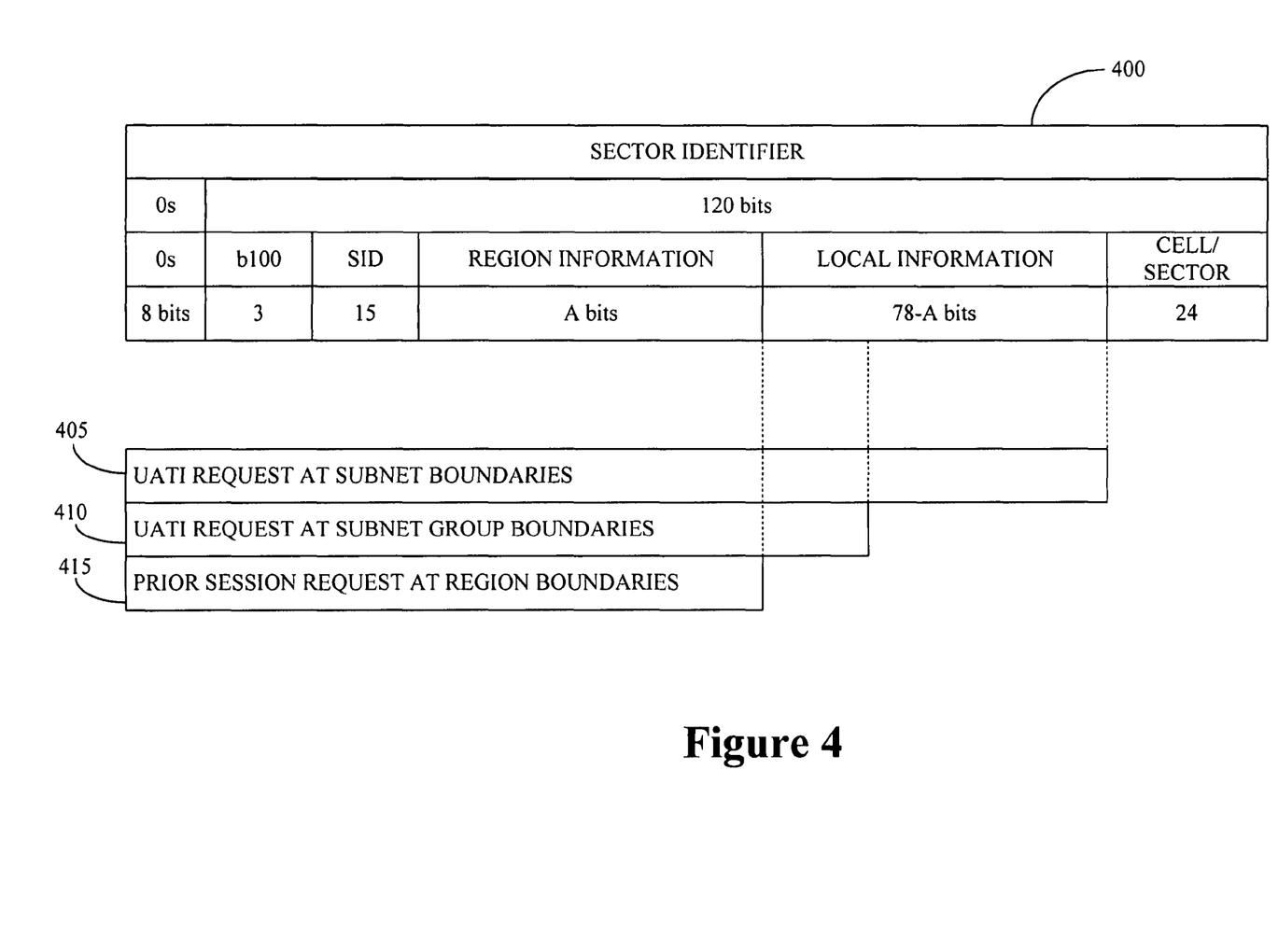
FIG. 4 conceptually illustrates one exemplary embodiment of a sector identifier, in accordance with the present invention.

FIG. 4 conceptually illustrates one exemplary embodiment of a sector identifier 400. In the illustrated embodiment, the first (most significant) at least 8 bits are binary zeros and the next up to 120 bits include information that indicates the subnet. The first non-zero bit indicates that the following two bits contain the format index for the remaining bits. In the case where these two bits are binary '00', it indicates that the following most significant fifteen bits are used to indicate a system identifier. The next 78 most significant bits are used to indicate regional and local information. In the illustrated embodiment, a predetermined number A of the 78 bits are used to indicate a region including one or more subnets and the next 78-A bits are used to indicate local information indicative of the subnets. As discussed above, the 104 most significant bits, e.g. the bits used to indicate the zeros, the b100 field, the system identifier, the region information, and the local information, may be represented by an 8-bit alias or color code. The 24 least significant bits of the subnet identifier may be used to indicate information associated with one or more cells or sectors associated with the subnet.

Base stations may broadcast the sector identifier 400 and mobile units may receive the sector identifier 400. The mobile unit(s) may compare portions of their assigned UATI to corresponding portions of the sector identifier 400. In one embodiment, the mobile unit may apply a subnet boundary mask 405 corresponding to the bits containing regional and local information to the UATI and the sector identifier 400. The masked portions of the UATI and the sector identifier 400 may then be compared to determine whether the mobile unit has crossed a subnet boundary. For example, if the masked portions match, the mobile unit may not have crossed a subnet boundary, but if they do not match, the mobile unit has crossed a subnet boundary. Alternatively, the mobile unit may apply a subnet group boundary mask 410 corresponding to the bits containing a portion of the regional and local information associated with a subnet group to the UATI and the sector identifier 400. Thus, if the masked portions match, the mobile unit has not crossed a subnet group boundary, but if they do not match, the mobile unit has crossed a subnet group boundary.

The mobile unit may also compare other masked portions of their UATI and the sector identifier 400. In one embodiment, the mobile unit may apply a region boundary mask 415 corresponding to the bits containing regional information to the UATI and the sector identifier 400. The regional information may be chosen to indicate groups of one or more subnets that are associated with color codes that uniquely identify the subnets within that region. Thus, if the masked portions associated with the regions match, the mobile unit may be able to use the color code to identify the serving subnet (and/or locate the originating subnet), but if they do not match, the mobile unit has crossed a region boundary into a new region so that the mobile unit may not be able to identify the serving subnet (and/or locate the originating subnet) using the color code. In one embodiment, the mobile unit may apply the region boundary mask 415 in response to detecting differences in the portions of the UATI and sector identifier 400 masked by either the subnet mask 405 or the subnet group mask 410.

Figure 5:
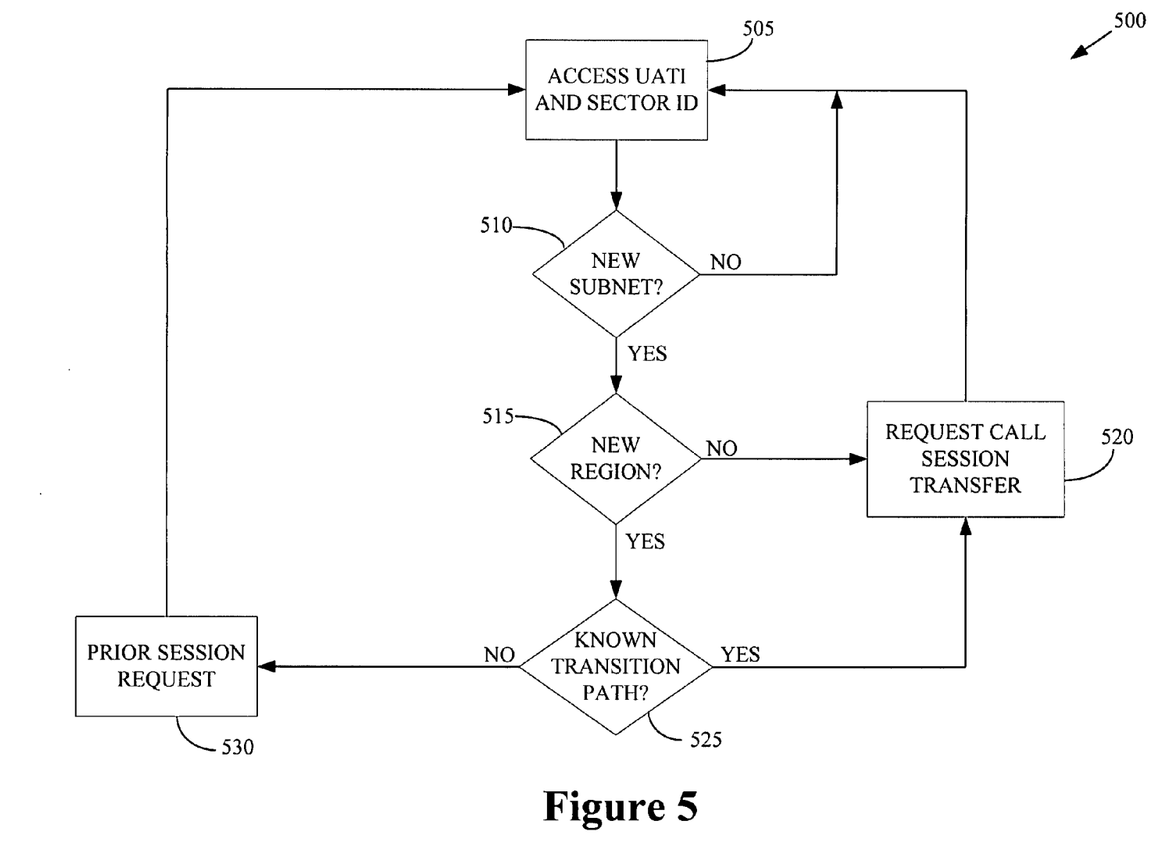
FIG. 5 conceptually illustrates one exemplary embodiment of a method of performing an inter-subnet idle handoff, in accordance with the present invention.

FIG. 5 conceptually illustrates one exemplary embodiment of a method 500 of performing an inter-subnet idle handoff. In the illustrated embodiment, a UATI and a sector identifier are accessed (at 505). For example, a mobile unit may access (at 505) the UATI provided by a serving base station router associated with a serving subnet. The mobile unit may also access (at 505) the sector identifier broadcast by a base station router in the current subnet. Masked portions of the UATI and the sector identifier may then be compared to determine (at 510) whether the mobile unit is in a new subnet, as discussed above. If the mobile unit is not in a new subnet, then the mobile unit may continue to monitor (at 505) the broadcast sector identifier. If the mobile unit determines (at 510) that it is in a new subnet, then the mobile unit may use another masked portion of the UATI and the sector identifier to determine (at 515) whether or not the mobile unit has entered a new region, wherein the color codes may not uniquely identify the subnets. The mobile unit may then select (at 515) a call session transfer technique based on whether or not the mobile unit has entered a new region.

When the mobile unit determines (at 510) that it is in a new subnet but it determines (at 515) that it is not in a new region, then the color code may be used to determine the originating and/or serving subnets in the original region. The mobile unit may select (at 515) a normal idle mode call session transfer and request (at 520) that the call session be transferred from the originating subnet to the new serving subnet. For example, call session state information may be transferred from the previous serving base station router to the current serving base station router. However, if the mobile unit determines (at 510) that it is in a new subnet and determines (at 515) that it is also in a new region, then the color code may not necessarily be used to determine the originating and/or serving subnets. If the mobile unit can determine (at 525) the transition path from the previous subnet to the current subnet, then this information may be used to select (at 515) the normal idle mode call session transfer technique and request (at 520) that the call session be transferred from the originating subnet to the new serving subnet.

When the mobile unit determines (at 510) that it is in a new subnet and determines (at 515) that it is also in a new region, but the mobile unit cannot determine (at 525) the transition path from the previous subnet to the current subnet, then the mobile unit may select (at 530) a different call session transfer technique, such as a Prior Session request. In one embodiment, the prior session request (at 530) may include providing a request that a new call session be initiated between the mobile unit and a base station router in the new subnet. A connection associated with the new call session may be formed over an air interface between the mobile unit and the base station router. Once the new session is established, the call session information associated with the prior session may then be transferred to the base station router in the current subnet.

By providing the ability to select different call session transfer techniques for inter-subnet handoffs using one of the embodiments described above, the ability to control idle handoffs may be improved. For example, service operators may be able to select locations of borders between regions so that new call sessions may not need to be established for idle handoffs in which the mobile unit is unable to determine the transition path to the new subnet. Accordingly, the number of idle mode handoffs that require formation of a new call session with the new subnet (e.g., Prior Session requests) may be reduced. Forming new call sessions during idle mode handoffs is typically more error prone that techniques that transfer call sessions, and so embodiments of the techniques described above may reduce the number of errors in idle mode handoffs.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   accessing, at an idle mobile unit, a first identifier assigned to identify the idle mobile unit having a first session with a first subnet and a second identifier associated with a second subnet;
   determining, at the idle mobile unit, whether the idle mobile unit has moved from the first subnet to the second subnet based on first portions of the first and second identifiers;
   requesting, at the idle mobile unit in response to the mobile unit moving from the first subnet to the second subnet, that the first session be transferred from the first subnet to the second subnet when the first and second subnets are included in a first subnet group; and
   requesting, at the idle mobile unit, that a second session be established with the second subnet when the first and second subnets are in different subnet groups.

2. The method of claim 1, wherein accessing the first identifier comprises accessing a Unicast Access Terminal Identifier assigned to identify the mobile unit, and wherein accessing the second identifier comprises accessing a sector identifier associated with the second subnet.

3. The method of claim 1, comprising determining whether the first subnet and the second subnet are included in the first subnet group in response to determining that the mobile unit has moved from the first subnet to the second subnet.

4. The method of claim 1, wherein determining whether the idle mobile unit has moved from the first subnet to the second subnet based on the first portions of the first and second identifiers comprises applying a first mask to the first and second identifiers and comparing first masked portions of the first and second identifiers.

5. The method of claim 4, wherein determining whether the idle mobile unit has moved comprises determining that the idle mobile unit has moved when the first masked portions of the first and second identifiers are different.

6. The method of claim 5, wherein determining whether the first and second subnets are included in the first subnet group comprises applying a second mask, different than the first mask, to the first and second identifiers and comparing second masked portions of the first and second identifiers.

7. The method of claim 6, wherein determining whether the first and second subnets are included in the first subnet group comprises determining that the first and second subnets are included in the first subnet group when the second masked portions of the first and second identifiers are the same.

8. The method of claim 7, comprising determining that the first subnet is included in the first subnet group and the second subnet is included in a second subnet group when the second masked portions of the first and second identifiers are different.

9. The method of claim 8, comprising determining whether a transition path from the first subnet to the second subnet is known.

10. The method of claim 9, wherein requesting that the second session be established comprises forming the second session associated with the second subnet in response to determining that the first subnet is included in the first subnet group and the second subnet is included in the second subnet group and in response to determining that the transition path from the second subnet to the first subnet is not known.

11. The method of claim 10, wherein forming the second session comprises forming the second session with a base station router in the second subnet.

12. The method of claim 10, wherein forming the second session comprises forming a connection associated with the second session.

13. The method of claim 12, comprising negotiating transfer of the first session using the connection associated with the second session.

14. The method of claim 1, comprising providing a request to transfer the first session from the first subnet to the second subnet when the first subnet and a second subnet are included in the first subnet group.

15. The method of claim 14, wherein providing the request to transfer the first session from the first subnet to the second subnet comprises providing a request including a color code associated with the first subnet.

16. The method of claim 14, wherein providing the request to transfer the first session from the first subnet to the second subnet comprises providing the request to a base station router in the second subnet.

17. A method, comprising:
    requesting, from an idle mobile unit that has roamed from a first base station router in a first subnet included in a first subnet group to a second base station router in a second subnet, that a first session with the first base station router be transferred to the second base station router when the second subnet is included in the first subnet group; and
    requesting, from the idle mobile unit, that a second session be established with the second base station router in the second subnet when the second subnet is not included in the first subnet group.

18. The method of claim 17, comprising negotiating transfer of the first session from the first base station router to the second base station router using a connection associated with the second session.

* * * * *